(12) United States Patent
Udriste

(10) Patent No.: US 9,193,465 B2
(45) Date of Patent: Nov. 24, 2015

(54) ELECTROMECHANICAL ACTUATION SYSTEM FOR AIRCRAFT PASSENGER SUITES AND METHOD

(71) Applicant: B/E Aerospace, Inc., Wellington, FL (US)

(72) Inventor: Daniel I. Udriste, Coral Springs, FL (US)

(73) Assignee: B/E Aerospace, Inc., Wellington, FL (US)

( * ) Notice: Subject to any disclaimer, the term of this patent is extended or adjusted under 35 U.S.C. 154(b) by 422 days.

(21) Appl. No.: 13/671,691

(22) Filed: Nov. 8, 2012

(65) Prior Publication Data

US 2013/0113250 A1    May 9, 2013

Related U.S. Application Data

(60) Provisional application No. 61/556,876, filed on Nov. 8, 2011.

(51) Int. Cl.
    *G05D 1/00*      (2006.01)
    *B64D 11/06*      (2006.01)

(52) U.S. Cl.
    CPC .......... *B64D 11/06* (2013.01); *B64D 11/0601* (2014.01); *B64D 11/064* (2014.01); *B64D 11/0606* (2014.01); *B64D 11/0641* (2014.01); *B64D 11/0696* (2013.01); *B64D 11/06395* (2014.01)

(58) Field of Classification Search
None
See application file for complete search history.

(56) References Cited

U.S. PATENT DOCUMENTS

| | | | |
|---|---|---|---|
| 5,651,587 A | 7/1997 | Kodaverdian | |
| 6,009,355 A * | 12/1999 | Obradovich et al. | 701/1 |
| 6,194,853 B1 * | 2/2001 | Tual et al. | 318/266 |
| 6,441,576 B1 | 8/2002 | Marin-Martinod et al. | |
| 6,731,088 B2 * | 5/2004 | Nivet | 318/548 |
| 6,934,137 B2 * | 8/2005 | Elliott et al. | 361/62 |
| 7,611,198 B2 * | 11/2009 | Schweizer | 297/217.3 |
| 7,647,151 B2 | 1/2010 | Abt et al. | |
| 7,695,065 B2 * | 4/2010 | Terno et al. | 297/217.3 |
| 7,911,163 B2 | 3/2011 | Nivet | |
| 8,210,605 B2 * | 7/2012 | Hough et al. | 297/188.05 |
| 8,457,846 B2 * | 6/2013 | Fischer et al. | 701/49 |
| 2001/0020202 A1 * | 9/2001 | Obradovich et al. | 701/1 |
| 2003/0098661 A1 * | 5/2003 | Stewart-Smith | 318/445 |
| 2003/0194967 A1 * | 10/2003 | Sanford et al. | 455/3.06 |
| 2006/0004505 A1 * | 1/2006 | Christiansen et al. | 701/49 |
| 2006/0186715 A1 * | 8/2006 | Schweizer | 297/217.3 |
| 2007/0200524 A1 | 8/2007 | Robert | |
| 2008/0009989 A1 * | 1/2008 | Kim et al. | 701/36 |
| 2011/0166749 A1 | 7/2011 | Muirhead | |
| 2014/0197666 A1 * | 7/2014 | Koch | 297/217.3 |

OTHER PUBLICATIONS

International Search Report for PCT/US2012/064052 dated Feb. 28, 2014.

* cited by examiner

*Primary Examiner* — Medhat Badawi

(74) *Attorney, Agent, or Firm* — Shumaker, Loop & Kendrick, LLP

(57) ABSTRACT

An electromechanical actuation system for an aircraft passenger suite for allowing passenger-initiated adjustment of a passenger seat and related passenger accoutrements including a suite control unit configured to receive command signals from a user interface, and a first line replacement unit comprising a first integral electronic control unit and a second line replacement unit coupled to the first line replacement, wherein the first electronic control unit controls operation of the first line replacement unit and the second line replacement unit in response to command signals received from the suite control unit.

8 Claims, 11 Drawing Sheets

ELECTROMECHANICAL ACTUATION SYSTEM FOR AIRCRAFT PASSENGER SUITES AND METHOD

CROSS-REFERENCE TO RELATED APPLICATION

This application claims priority to U.S. Provisional Application No. 61/556,876 filed Nov. 8, 2011, the entirety of which is incorporated by reference herein.

TECHNICAL FIELD AND BACKGROUND OF THE INVENTION

This application relates to electromechanical actuation systems for aircraft passenger suites, and related methods of operating such systems. In general, the systems and methods relate to passenger-initiated motions to passenger seats, and related comfort accessories and devices, collectively referred to as a passenger "suite". Such suites can be found in super first class sections of commercial transport aircraft, for example.

An electromechanical actuation system disclosed in this application can activate a privacy divider, suite lighting and various seat features, including seat back recline, leg rest extension and retraction, seat pan extension and retraction, seat forward/aft translation, armrest height adjustment, headrest height adjustment and lumbar inflation/deflation elements, principally of the type found in long haul, premium class seating. Each suite can include at least one Electronic Control Unit (ECU) for controlling the movement of the various system actuators and components in response to passenger commands provided through an appropriate user interface. Each ECU can be programmed with software that controls and coordinates the movement of individual actuators and other suite components in order to provide desired adjustments to the passenger's seat or other accoutrements within the associated suite. The software can operate intuitively and selectively actuate appropriate actuators to accomplish passenger intent within geometric constraints, including obstacle detection, for example.

One feature of the invention is that each suite can include at least one Line Replacement Unit ("LRU") having an integral ECU configured and programmed to control operation of other LRUs within the suite. A suite can include various types of LRUs, including but not limited to various electromechanical seat control actuators, suite lighting units, pumps, comfort actuators, vibrators, and the like. As used in this application, a LRU can be any electrical, electromechanical or electronic unit, such as a linear or rotary actuator, a controller, a pump, a light fixture, or the like. A suite's various LRUs can be interconnected in series by an appropriate communication link, commonly referred to as a point to point "daisy chain." One example of a communication link connecting the various LRUs is a CANBUS network, though other suitable communication links can also be used. The ECU of each suite can be integrated into any programmable electrical LRU that communicates and collects data to and from other programmable LRUs, communication boxes such as junction boxes, in-flight entertainment ("IFE") units, and the like. A selected LRU can act as the primary electronic controller for all LRUs within its associated passenger suite. In addition, one or more secondary LRUs can also include ECUs and can be programmed to take on or assume the role of primary controller in the event the original selected LRU malfunctions. This provides a degree of redundancy to the system that permits continued operation between service sites. Each ECU can be connected to a Suite Control Unit ("SCU") for managing operation of all of the LRUs within the ECU's associated suite.

Any secondary LRU within a passenger suite can be provided with an ECU and be programmed to take or assume the role of a primary controller in the event that the original selected LRU malfunctions or is removed from service.

The primary ECU and a plurality of seat LRUs can be associated with respective suites, and can be interconnected in series through a wire harness or a wireless communication system to the suites primary ECU.

The primary suite ECU can be chosen as being any seat device that has the capability of storing data and control/communication software for controlling operation of other peripheral LRUs within a passenger suite. The primary ECU typically includes an electromechanical assembly and an electronic processor, including memory and communication capability. Because of the interconnectivity between multiple LRUs, control of each LRU within a suite can be assigned to any number of LRUs that include programmed ECUs.

BRIEF SUMMARY OF THE INVENTION

One aspect of the present invention includes providing a system that activates a plurality of movable features in an aircraft seating environment, such as a privacy divider, suite lighting and the seat features, including seat back recline, legrest rotation, seat pan extension, seat forward/aft translation, armrest height travel, headrest height adjustment, lumbar inflation/deflation elements, and the like, principally of the type found in long haul, premium class seating.

Another aspect of the invention includes providing an aircraft suite that includes a primary or "master" LRU which is an electromechanical assembly with an integral electronic control unit (ECU) that is serially connected with a plurality of secondary or "slave" LRUs by a data bus. The ECU can be any programmable electrical device that can communicate with and transfer data and commands to and from the secondary LRUs or communication units, such as junction boxes or in-flight entertainment ("IFE") units. The selected LRU becomes the primary controller of the entire suite. In addition, any secondary LRU can also include an ECU, and can be programmed to take or assume the role of the system's primary controller in case the ECU of the original primary LRU malfunctions.

These and other aspects of the invention are achieved by providing an electromechanical actuation system for an aircraft passenger suite that allows passenger-initiated adjustment of a passenger seat and related passenger comfort accessories or accoutrements. The system can include a passenger seat having selectively movable features such as a seat back recline, leg rest rotation, seat pan extension, seat forward/aft translation, armrest height travel, headrest height adjustment, lumbar inflation/deflation adjustment assemblies, and the like. Passenger-initiated actuators are electromechanically connected to the adjustment assemblies for moving the adjustment assemblies, and can be adapted for preventing spacial interference between motions of two or more of the adjustment assemblies taking place during a time interval. A suite control unit (SCU) transmits passenger-initiated command signals to a series of seat actuators, lighting fixtures, comfort/massage devices, etc. (collectively LRUs) within the passenger suite. The SCU and the plurality of LRUs are preferably interconnected in a series or daisy chain arrangement by a data bus, such as CANBUS, for example. Any of the plurality of LRUs can include an electronic control unit (ECU) and serve as a primary controller for the other LRUs in its suite. In addition, two or more LRUs can include ECUs, and can serve as the primary controller in the event of a malfunction of the initial primary controller. Each LRU that includes an ECU can be referred to as a suite control module (SCM). A suite can include a single SCM, or two or more of the suite's LRUs can be configured as SCMs. Each SCM can be configured and programmed to receive control commands from the SCU, and in response to such commands, send control signals to each of the system LRUs to initiate a requested response. When a suite includes a plurality of SCMs, each SCM can be configured to assume control of the suite's LRUs if the original controlling SCM becomes inoperative. A passenger control panel is provided and permits a passenger seated in one of the seats to control the passenger seat adjustment assemblies.

According to yet another embodiment of the invention, an SCM includes a mechanical assembly, an electrical assembly and an electronic processor with electronic memory and a communication capability.

According to yet another embodiment of the invention, a vertically adjustable privacy divider is positioned between first and second laterally-adjacent seat suites. The primary seat controller includes passenger priority sequencing that allows a first passenger seated in the first of the seats to control the position of the privacy divider to the exclusion of a second passenger seated in the second seat while activating a privacy divider control, and that allows the second passenger seated in the second seat to control the position of the privacy divider while activating a privacy divider control to the exclusion of the first passenger seated in the first seat.

According to yet another embodiment of the invention, a suite includes at least one SCM and a plurality of slave LRUs connected in series via a controller area network bus.

According to yet another embodiment of the invention, an obstacle sensor is provided so that when an obstacle is encountered during movement of a seat adjustment assembly, the obstacle sensor commands the passenger-initiated actuator to stop moving, move the seat a predetermined distance in an opposite direction, and stop.

According to yet another embodiment of the invention, an electromechanical actuation system is provided for an aircraft passenger suite for allowing passenger-initiated adjustment of a passenger seat and related passenger comfort accessories or accoutrements. The system can include a passenger seat having seat back recline, legrest rotation, seat pan extension, seat forward/aft translation, armrest height travel, headrest height adjustment and lumbar inflation/deflation adjustment assemblies, for example. Passenger-initiated actuators are electromechanically connected to the adjustment assemblies for moving the adjustment assemblies, and can be adapted for preventing spacial interference between motions of two or more of the adjustment assemblies taking place during a time interval. A suite control unit is provided for controlling each of the passenger-initiated actuators. A suite control module (SCM) includes an LRU having an integral ECU. The SCM includes a mechanical assembly, an electrical assembly and an electronic processor, electronic memory and a communication capability. Any other of the plurality of suite LRUs can also be adapted to assume the role of SCM in the event of a malfunction of the original SCM. The original SCM and the secondary SCMs can be interconnected in a series arrangement by a suitable communication link or data bus. The suite can include an electromechanical system that has integral electronic controls attached to a plurality of LRUs, each of which is capable of acting as the SCM. In one embodiment, all of the suites LRUs include an ECU and are capable of functioning as the master SCM. A passenger control panel permits a passenger seated in one of the seats to control the passenger seat adjustment assemblies.

According to yet another embodiment of the invention, a plurality of SCMs are connected in series via a controller area network bus.

In another embodiment, provided herein is a method of controlling a plurality of aircraft passenger suites for allowing passenger-initiated adjustment of a passenger seat and related passenger comfort accessories, the method including providing an electromechanical actuation system for an aircraft passenger suite for allowing passenger-initiated adjustment of a passenger seat and related passenger comfort accessories and accoutrements. The system includes an adjustable passenger seat having various adjustment features such as seat back recline, legrest rotation, seat pan extension, seat forward/aft translation, armrest height travel, headrest height adjustment, lumbar inflation/deflation adjustment assemblies, and the like, and passenger-initiated actuators electromechanically connected to the adjustment assemblies for moving the adjustment assemblies. The system can be adapted for preventing spacial interference between motions of two or more of the adjustment assemblies taking place during a time interval. One or more suite control units can be provided for controlling the passenger-initiated actuators, wherein a selected LRU having an integral ECU acts as the initial or primary SCM, and any other of the plurality of LRUs is adapted to assume the role of a substitute SCM in the event of a malfunction in the original SCM. An electromechanical system is provided that has substitute secondary SCMs having integral electronic controls, and is capable of acting as the primary SCM for the systems various LRUs. The plurality of SCMs is configured in series via a controller area network bus. A passenger control panel is provided for permitting a passenger seated in one of the seats to control the passenger seat adjustment assemblies.

DETAILED DESCRIPTION OF THE INVENTION

Figure 1:
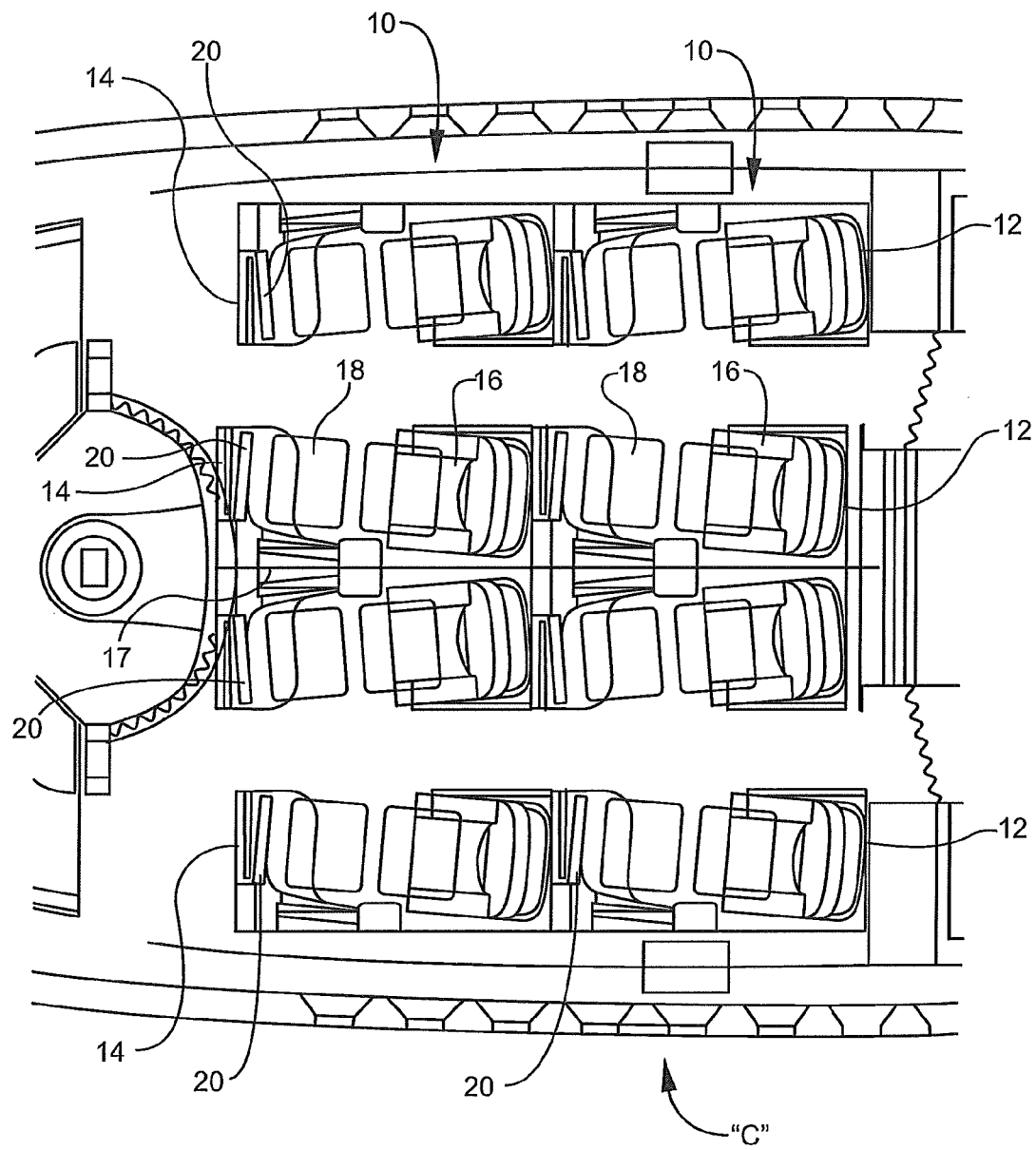
FIG. 1 is a top plan layout view of a premium class aircraft passenger compartment showing an array of eight passenger seat suites according to an embodiment of the invention.
Figure 2:
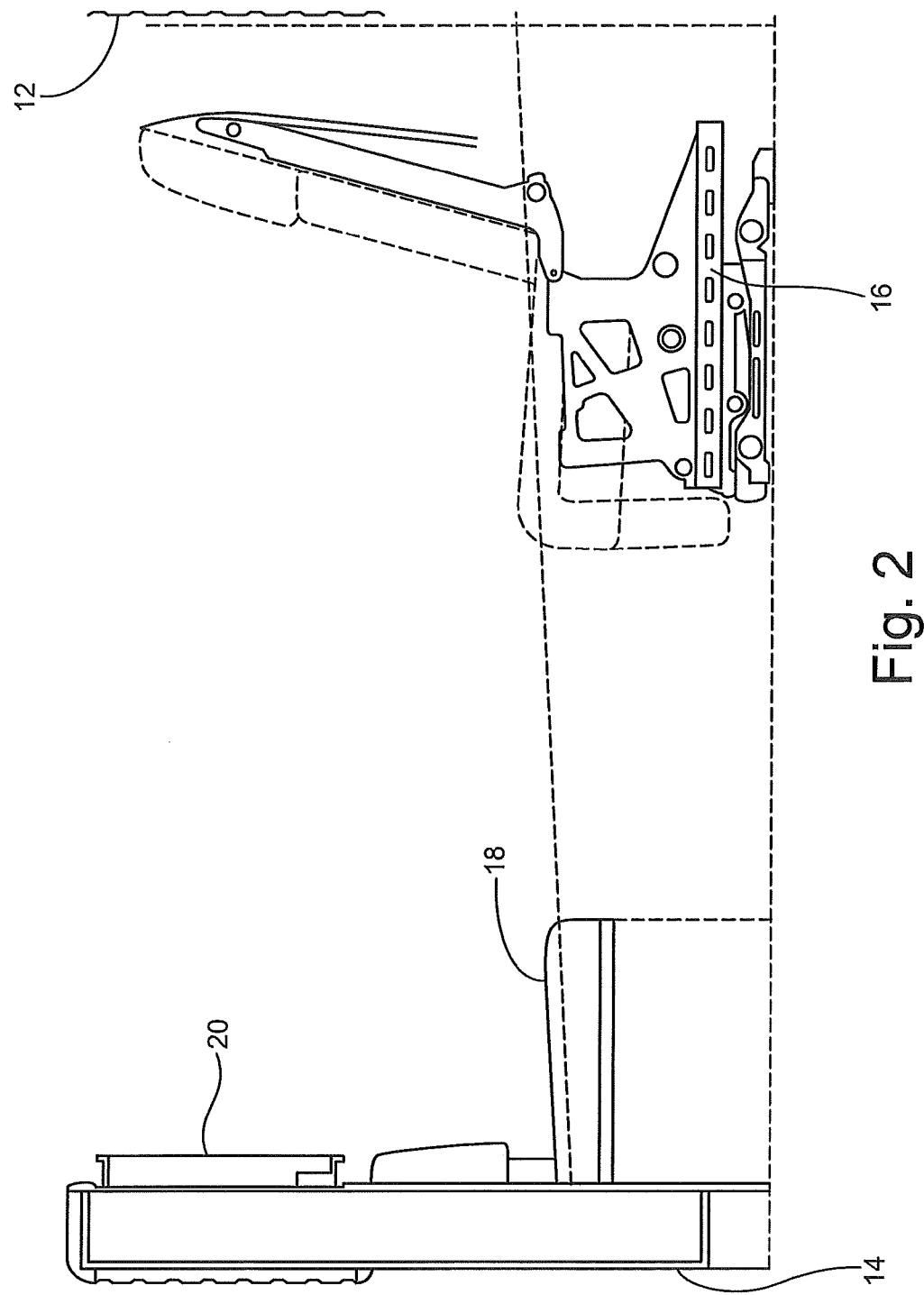
FIG. 2 is a schematic side elevation of a single passenger seat suite shown in FIG. 1, with the seat in the upright, take-off position.

Referring now to the drawings, FIG. 1 shows a top plan layout view of a premium class aircraft passenger compartment "C" showing an array of eight passenger suites 10 according to one embodiment of the invention. Of course, the invention is not limited to any particular number or configuration of suites or seats. As shown in FIGS. 1 and 2, the passenger suite 10 includes a rear panel 12, a front panel 14, a seat 16 shown in its upright, taxi, take-off and landing ("TTOL") position, a privacy divider 17 between adjacent suites 10, an ottoman 18, a video monitor 20, and other passenger comfort features and structures, not shown in FIG. 2. The seat 16 and ottoman 18 are mounted by appropriate fittings to tracks or other fastener elements on or in the aircraft deck.

Figure 3:
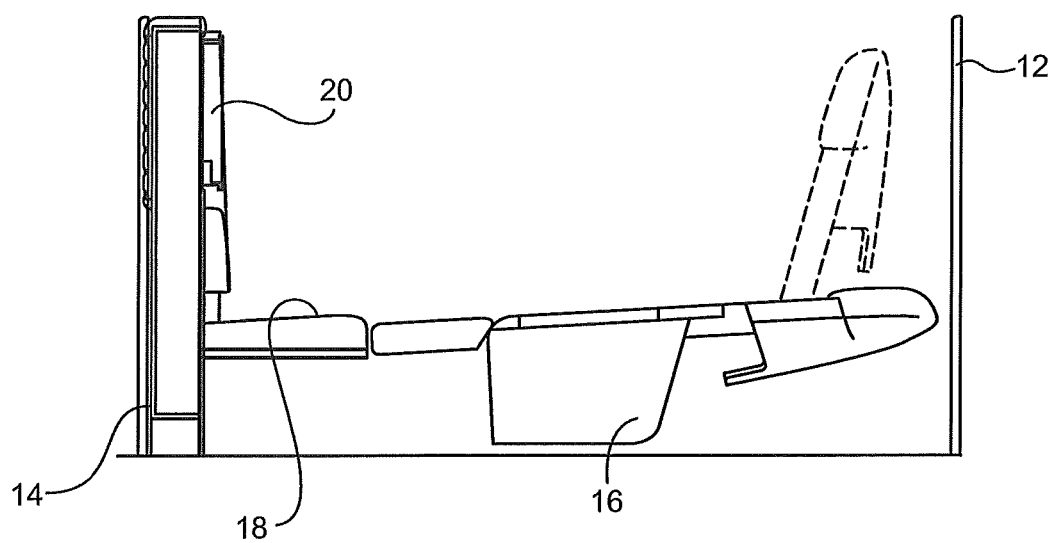
FIG. 3 is a schematic side elevation of a single passenger seat suite shown in FIG. 1, with the seat in the full, lie flat position.

FIG. 3 shows the seat 16 in the full, lie flat position with the foot of the seat 16 abutting the ottoman 18 to form an extended length lie flat bed.

Figure 4:
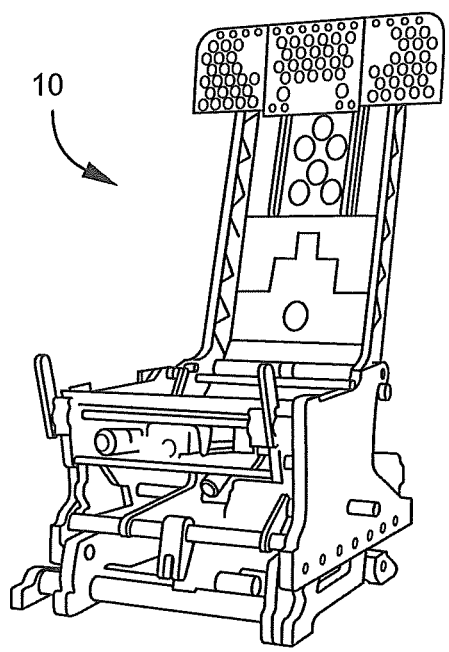
FIG. 4 is an overall structural view of the mechanical elements of a passenger seat incorporating the elements of the invention described in this application.
Figure 5:
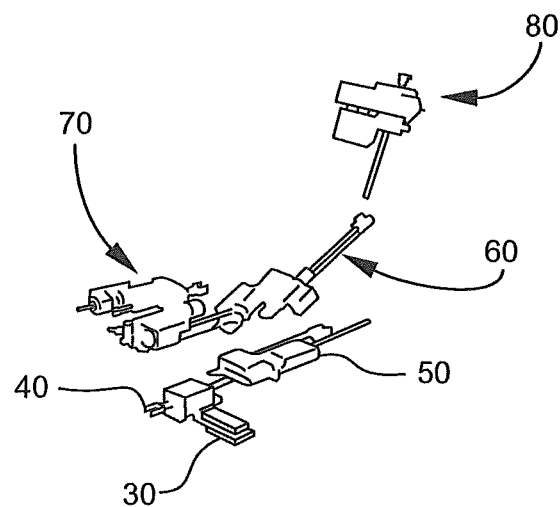
FIG. 5 is a fragmentary view of the actuators used on the passenger seat and their relative position in relation to the seat shown in FIG. 1.
Figure 6:
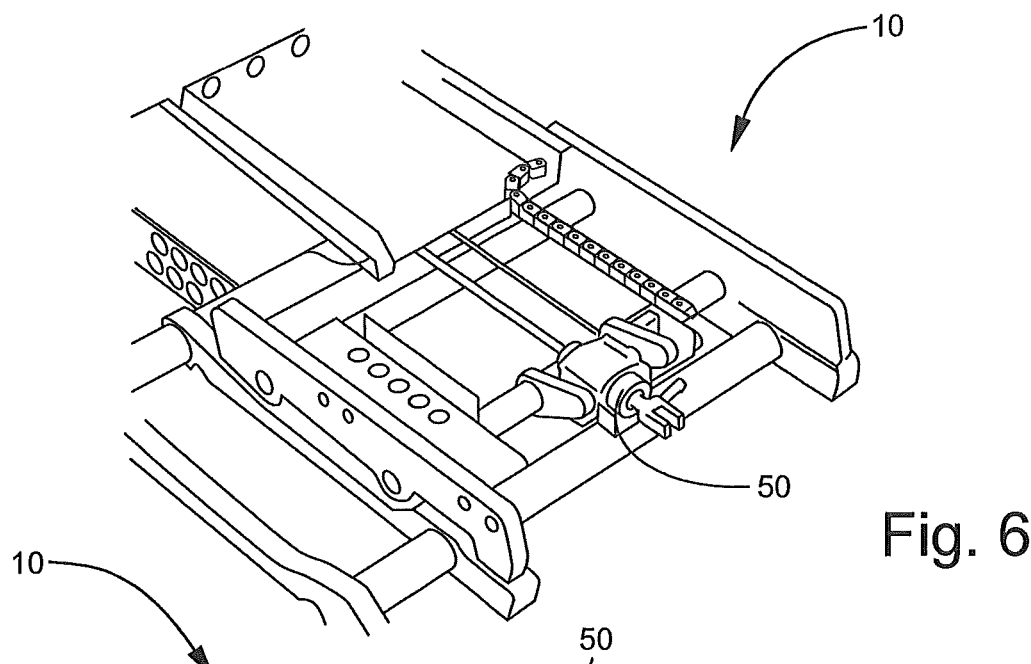
FIG. 6 is a perspective view of the seatpan, legrest and translation actuators in position on the lower seat frame.
Figure 7:
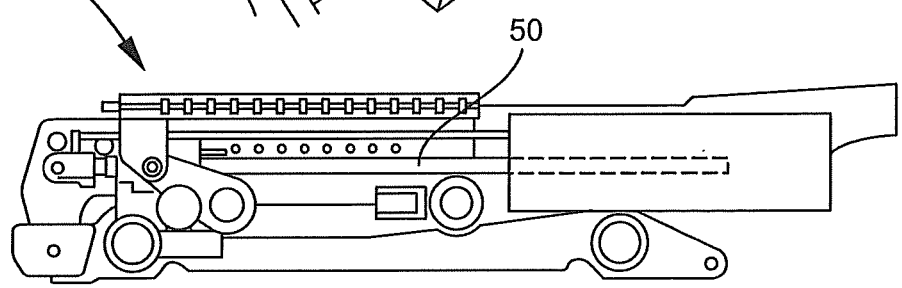
FIG. 7 is a side elevation view of the seatpan, legrest and translation actuators in position on the lower seat frame.
Figure 8:
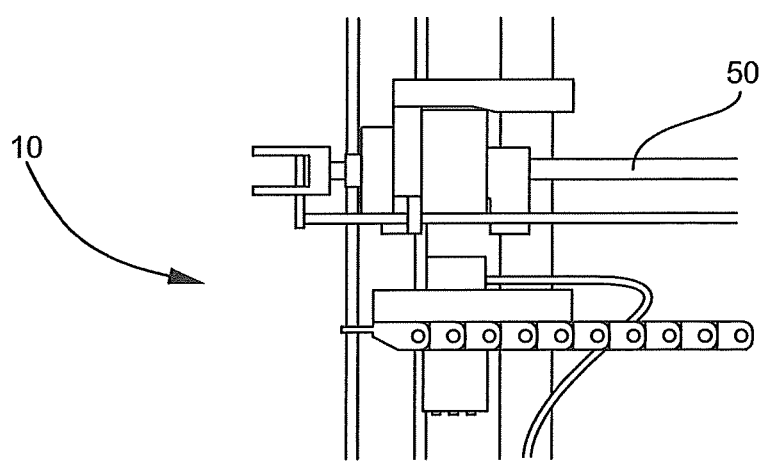
FIG. 8 is a partial top plan view of the seatpan, legrest and translation actuators in position on the lower seat frame.

FIG. 4 broadly illustrates the mechanical elements of the passenger seat 16 incorporating the elements of the invention described in this application. FIG. 5, shows a plurality of electromechanical actuators used on the passenger seat and their relative position in relation to the seat shown in FIG. 1, namely, the seat pan, leg rest and translation actuators 30, 40 and 50, respectively, in position on the lower seat frame, as well as an armrest actuator 70 and a legrest actuator 80. See also, FIGS. 6, 7 and 8.

Figure 9:
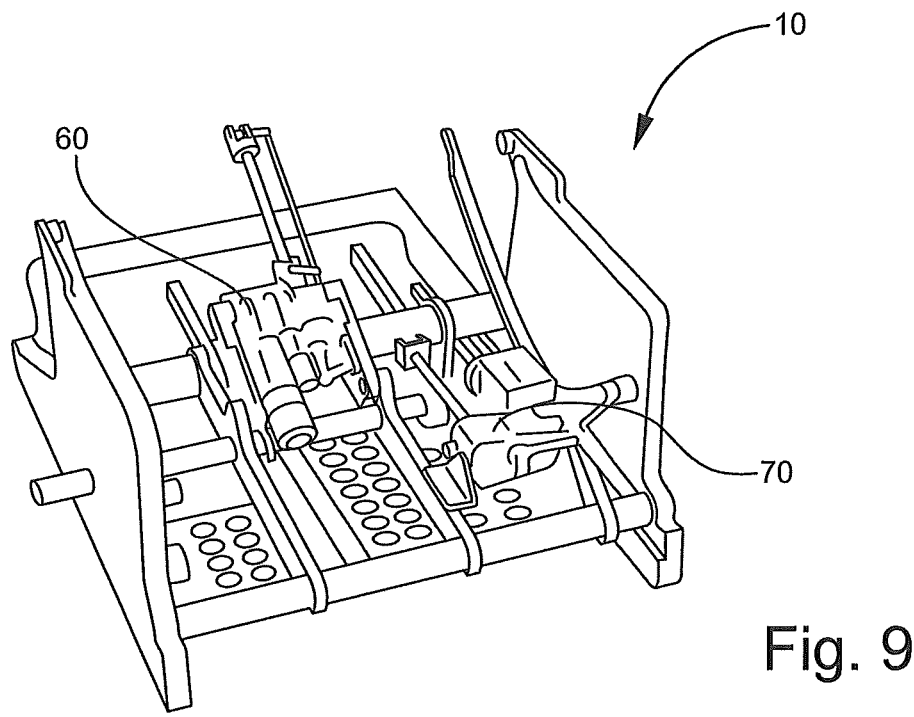
FIG. 9 is a perspective view of the recline actuator and the armrest actuator in position on the lower seat frame.
Figure 10:
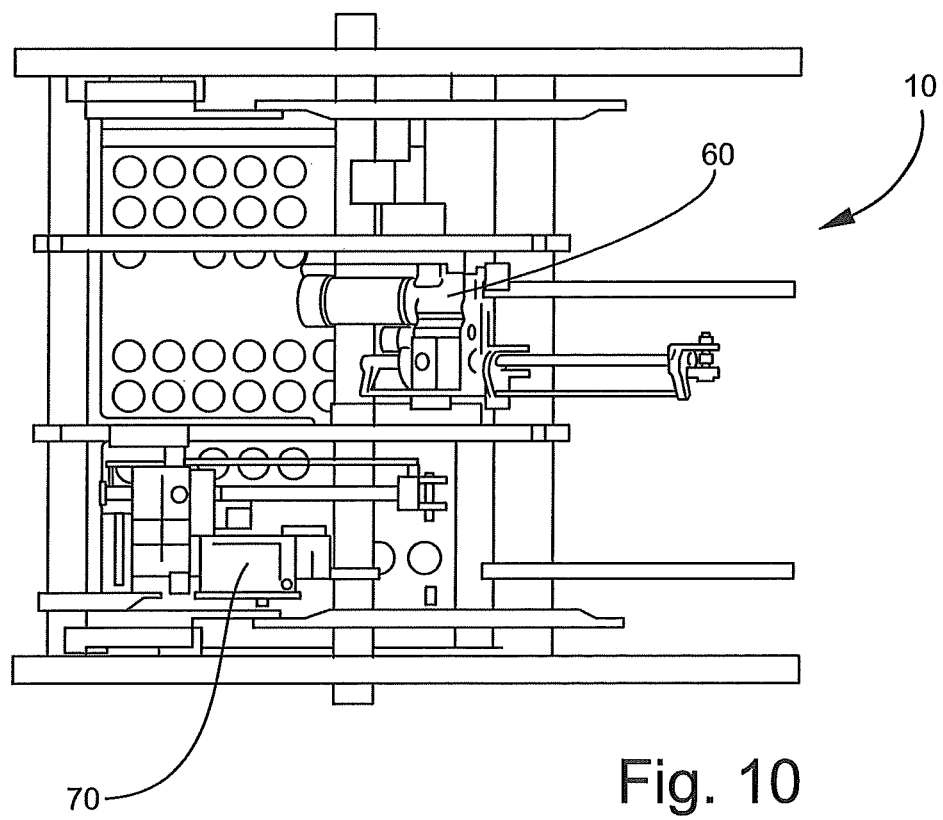
FIG. 10 top plan view of the recline actuator and the armrest actuator in position on the lower seat frame.

FIGS. 9 and 10 illustrate the recline actuator 60 that functions to move the seat back of the seat 16 between the full upright and lie flat positions, including intermediate comfort positions. A single armrest actuator 70 in the lower seat frame simultaneously operates left and right arm rests between upper and lower comfort positions.

Figure 11:
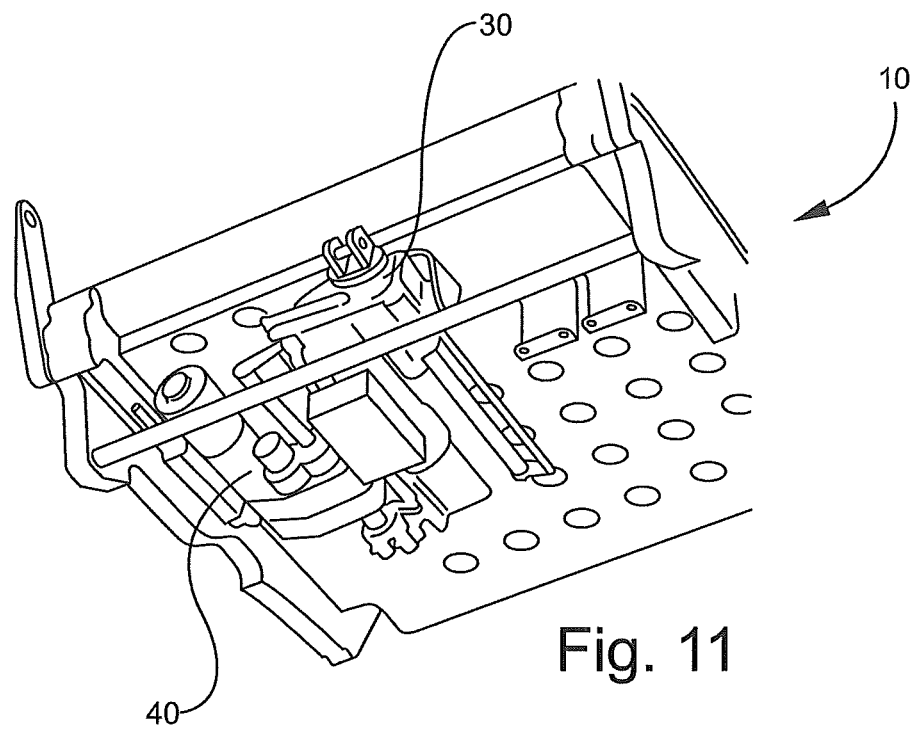
FIG. 11 is a perspective view, looking upwardly to the lower seat frame, of the seatpan extension actuator and the legrest actuator in position on the lower seat frame.
Figure 12:
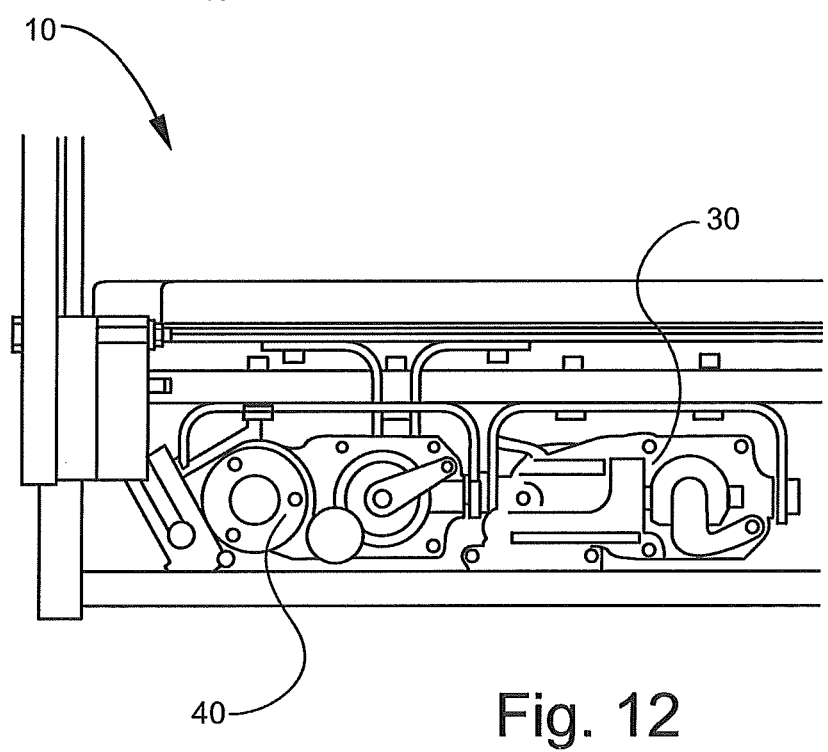
FIG. 12 is a side elevation view of the seatpan extension actuator and the legrest actuator in position on the lower seat frame.

FIG. 11 is a perspective view, looking upwardly to the lower seat frame, of the seatpan extension actuator 30 and the legrest actuator 40 in position on the lower seat frame. The seat pan extension actuator 30 and the legrest actuator 40 operate to translate the seatpan and legrest forwardly during translation of the seat 16 into the lie flat position and operate to translate the seatpan and legrest rearwardly during translation of the seat 16 into the upright position, as well as intermediate positions. See also FIG. 12.

Figure 13:
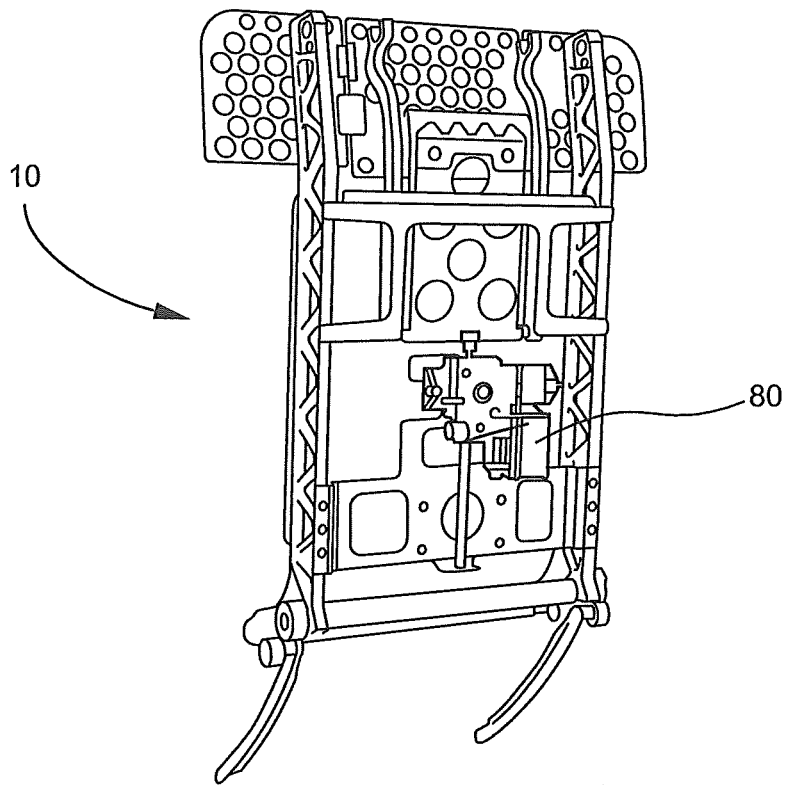
FIG. 13 is a perspective rear view of the seat back of the passenger seat showing the headrest actuator position.
Figure 14:
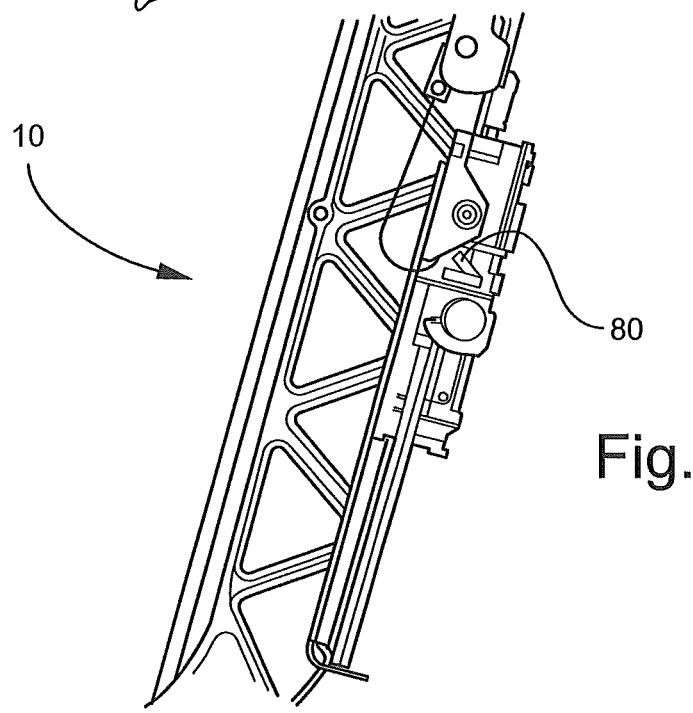
FIG. 14 is a side elevation view of the seat back of the passenger seat showing the headrest actuator position.

FIG. 13 shows the position of the headrest actuator 80 on the seatback, and FIG. 14 is a side elevation view of the seat back of the passenger seat showing the headrest actuator position. Of course, the passenger suite control system described herein can be used with other adjustable seats and movable passenger accoutrements, is not limited to use with the specific seat 16 described herein.

Figure 15:
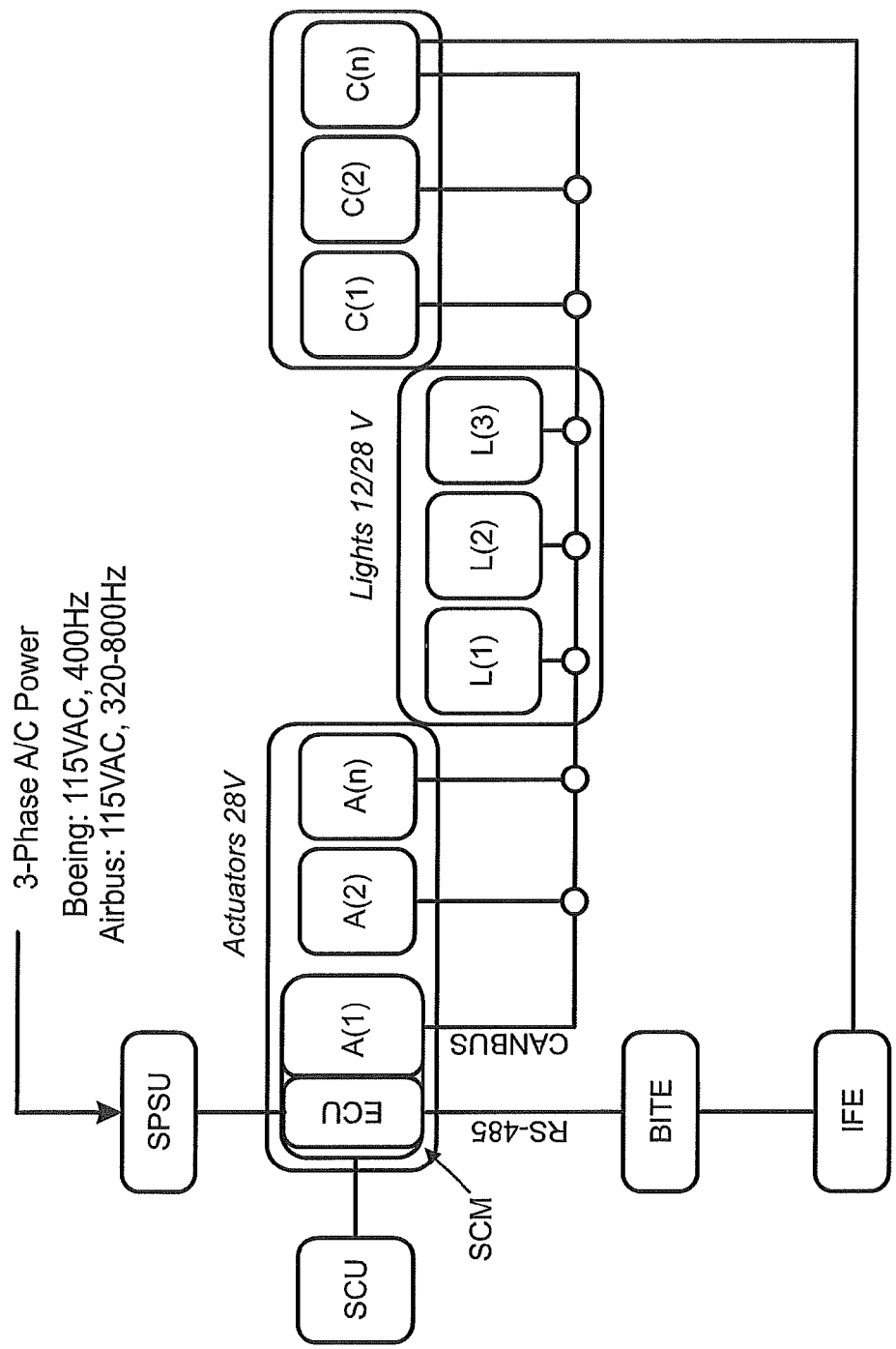
FIG. 15 is a simplified schematic of an aircraft passenger suite control system layout with an ECU integrated into one of the suite's electromechanical actuators.
Figure 16:
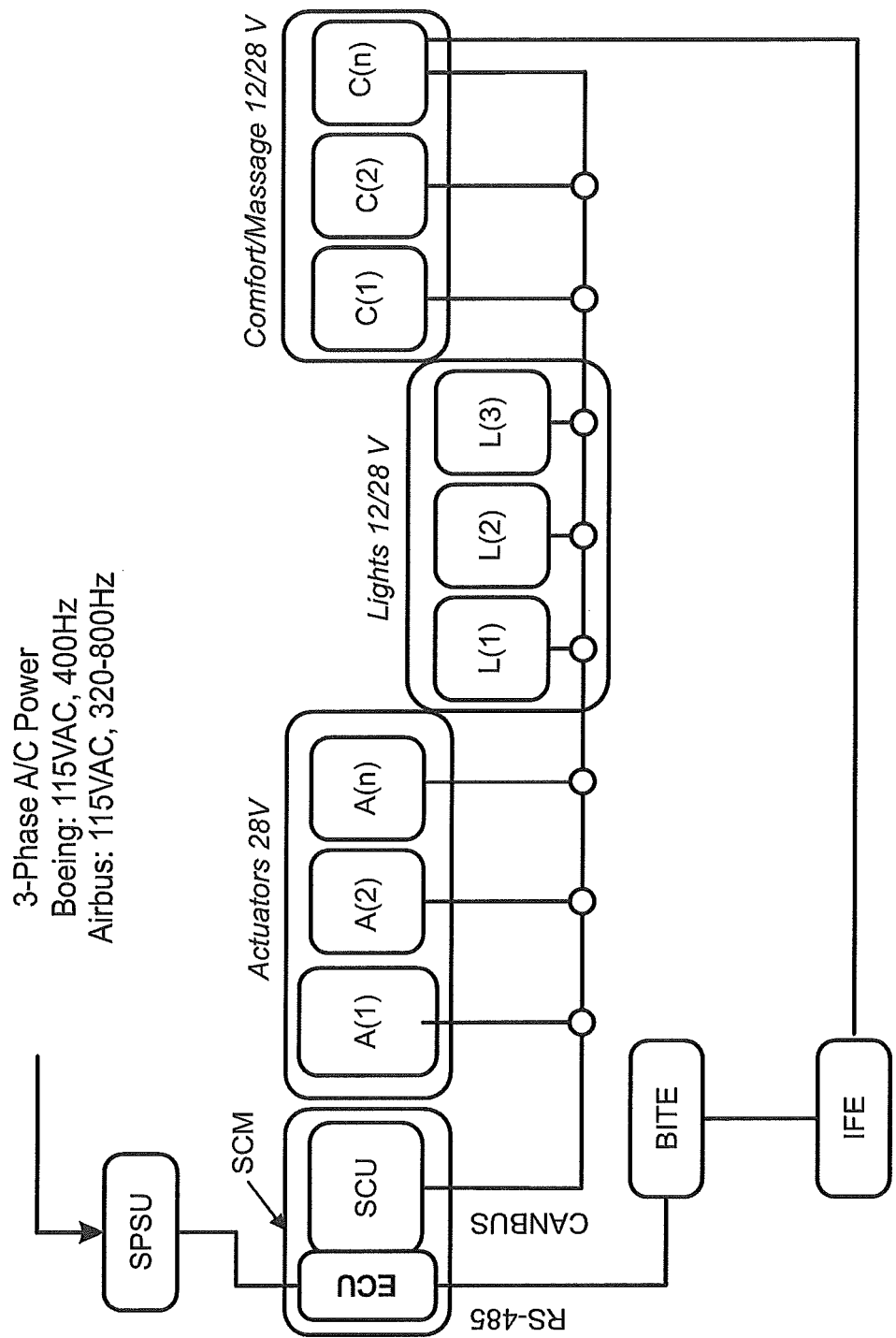
FIG. 16 is a simplified schematic of an alternative aircraft passenger suite control system layout, with an ECU integrated with the system's SCM.

FIG. 15 is a simplified schematic of a suite control system layout having an electronic control unit (ECU) integrally incorporated into an actuator according to one embodiment of the invention. FIG. 16 is a simplified schematic of an alternative suite control system layout, having an ECU integrally incorporated with a seat control module (SCM).

Figure 17:
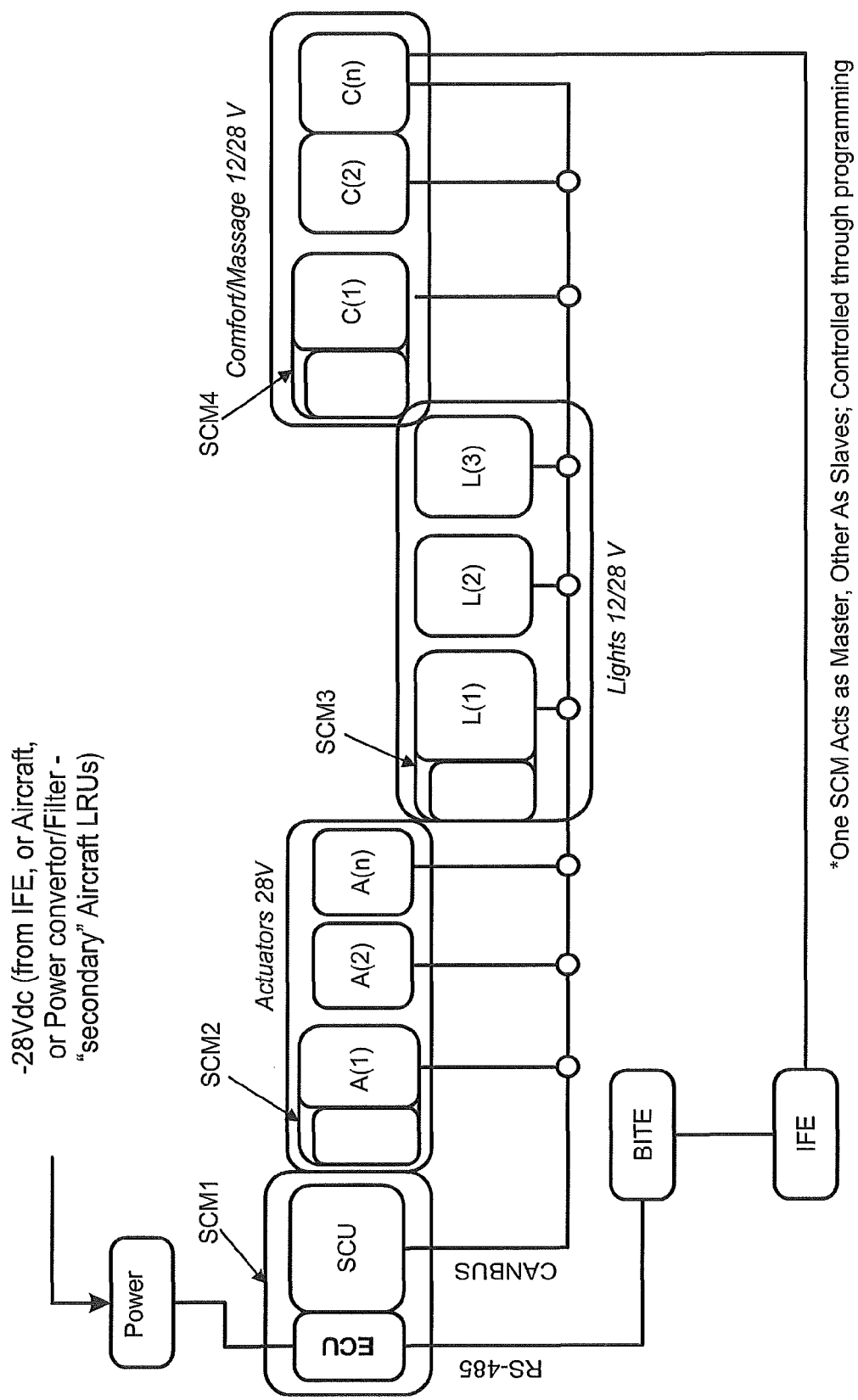
FIG. 17 is a simplified schematic of an alternative aircraft passenger suite control system layout in which the SCU, a suite actuator, a lighting unit, and a comfort/massage unit each include an electronic control unit and are capable of acting as the systems master SCM.

FIG. 17 is a simplified schematic of an alternative suite control system layout in which a suite control unit (SCU), actuator, lighting unit and comfort/massage unit each include an integral ECU.

Further details of the passenger suite 10 actuation and operation are described below, and include software that permits total time to move the seat 16 from the extreme lie flat position to the upright, normal position to be less than 20 seconds, as individually described below, under normal conditions. If the different seat functions are interlocked or speed is reduced for fulfilling the power requirement (<250 W), the total time to move the seat 16 from the extreme position (e.g., lie flat position or reclined) to the upright, normal seated position varies based on the number of actuators allowed to operate due to power constraints. All movement within the seat/suite are provided with soft starts and soft stops and are free-flowing without a jerking motion and are provided with automatic calibration.

The required line replacement units (LRUs) can be designed not to require external control units to interface with a suite control module (SCM). One or more of the system's LRUs can contain built-in electronics to interface directly with the suite control module.

Seat 16 is designed to have a TTOL position with 4° of seat pan angle, 15° of back upright angle, and 46 cm bottom cushion height at front edge from top of floor/pallet with the privacy divider 17 in any position. The seat 16 is provided with a separate control for the dining position for added ease in achieving the dining position, and has 10° of back angle and 4° of seat pan angle. In the lounge position, the seat back recline angle is 50° from upright with a seat pan rotation of 12°. In the, bed position, the angle is −3° as a result of a nose down orientation.

A separate seat comfort position is provided on the seat control. The seat back includes a lumbar system. This feature is considered a comfort adjustment and is not typically changed by selecting a preset position, i.e., it retains its occupant specified setting.

Exceptions to these settings include the fact that the TTOL position may be subject to Airbus or FAA regulation, and the lumbar and seat pan adjustment may vary when moving to the preset bed position. For example, when moving the seat 16 into bed position, the lumbar support will automatically deflate and the leg rest will fully deploy. In addition, the headrest is programmed to move as required to avoid geometric constraints.

Upon actuation to move from the TTOL to lie flat position, the recline actuator 60 and the translation actuator 50 begin their constant travel toward the full lie-flat position. As soon as practical, the leg-rest begins its deployment in order to avoid contact with the floor, and the seat pan extension begins to fully retract. As the seat 16 approaches the lie flat position, the headrest also moves to avoid any collisions with the suite structure.

To move the seat from the lie flat to the TTOL position, upon actuation, the recline actuator 60, translation actuator 50, and the leg-rest actuator 40 begin their constant travel toward the take off position. Legrest travel may be interrupted to facilitate stowage without contacting stay out zones.

In normal operation, the privacy divider 17, see FIG. 1, is controlled by the suite control module via the suite control unit (SCU). Center privacy dividers (up/down) are installed only on center passenger seat suites. Aisle-side flexible privacy panels (down/up) are also electrically actuated and controlled by the suite control module via the suite control unit. A mechanical override control is discreetly located within the suite 10 to allow stowage should override become necessary. Control of the center privacy panel is provided to both center passengers through the suite control unit, as described below.

During normal operation, the privacy divider 17 is attached to the lift mechanism and between the suite 10 side walls and moves into a full up position as a result of the privacy divider 17 lift mechanism being raised.

The number of turns the privacy divider 17 actuator is four (with the selected pinion gear) in order to achieve stroke of the 47 cm for the privacy divider 17 mechanism. The time required to achieve this position is approximately four seconds. With an open concept suite design and without overhead bins in the first class cabin, a handhold every 165 cm at the height of 84 cm is required. Thus, one of the privacy divider 17 panels may be required to be at the 84 cm level to meet this requirement. The privacy divider 17 is capable of being used even in the event of actuator or electrical failure.

Privacy divider 17 sequencing is necessary to accommodate the choices of the two passengers (Passenger A and Passenger B) sitting on opposite sides of the privacy divider 17. Passenger A selects either from an "UP" or "DOWN" icon on the SCU-A. The SCU-A will transmit the respective signal to the electronic control unit (ECU) segment of the suite control module. The electronic control unit will command the privacy divider 17 actuator to move in the appropriate direction. The electronic control unit will also send out a digital signal to the electronic control unit reporting the status of the SCU-A's command. The electronic control unit will communicate to SCU-B of Passenger B that the motion is being commanded. When Passenger B selects to move the privacy divider 17, the signal will be transmitted to electronic control unit. The electronic control unit will then send a digital signal to electronic control unit requesting the motion. Electronic control unit will then command the privacy divider 17 actuator and send a signal informing SCU-A that motion is in progress. The first passenger to initiate the privacy divider motion will have control of the privacy divider 17 as long as the button on the respective seat control is depressed. When the seat control button is released from the screen the other passenger will then have the ability to control the privacy divider 17, as desired. There is no lockout or other deductive-logic. The first passenger, whether Passenger A or B, to initiate motion for the privacy divider 17 has control as long as the seat control button is depressed.

Obstacle detection is defined for each actuator and is programmed in the suite control module before certification testing. When an obstacle is encountered, the suite control module control module stops moving, moves the seat 42 cm in the opposite direction and stops. The system provides obstacle detection logic when a force of 13.6 kg or more is retarding movement on any axis. The system must compensate for the weight of a $95^{th}$ percentile male passenger. The system calculates the obtrusive force by the rate of change and not by the load on the actuator.

The suite control module provides 28 VDC to power and control all the actuators, pump/controllers of the seat comfort system, lighting, and complies with the requirements of electromagnetic interference (RTCA DO 160—latest revision). The suite control module systems are interconnected via a daisy chain and can provide CANBUS ("Controller Area Network Bus") communications protocol between control actuators, lights/suite control unit, comfort massage system and lumbar system. The suite control module also provides the ability to accommodate 4 preset conditions:—TTOL, bed, companion or single dining and lounge through membrane switches.

The suite control module also provides for simultaneous movements for 6 seat surfaces (per double seat). If power is limited, the function is accomplished via power management software. The suite control module provides transparent, non-intrusive and continuous fault monitoring as well as CANBUS/RS485/RS232 interfacing protocols for remote diagnostics, troubleshooting and/or software upgrades. The unit contains heat sinks to ensure proper heat dissipation. A protective shroud is provided to prevent liquid spill hazards. The suite control module is programmable by means of an EEPROM or other memory device to allow software changes and upgrades. The suite control module stores failure information in the form of error codes for a minimum of 40 days.

The suite control module monitors all actuator positions via a feedback system. The feedback system has a "mechanical" memory, i.e., the position cannot be lost if the power is lost or the mechanical override is used with power, and can store and/or retain failure information in the form of an error code in memory.

Signal transmission time to the actuators from the suite control module is preferably less than 100 msec, i.e., the time required to start or stop the actuator from when the suite control module receives the command from the control unit. Any electrically operated seat motion includes a built-in safety feature that stops all motion in all positions and in all directions if encountering a 134N (13.6 kg) maximum interference load. The Seat Power Supply Unit ("SPSU") operates using aircraft three phase power, 115VAC. For the Boeing systems, the unit operates at a frequency of 400 Hz. For the Airbus system, the unit operates at a variable frequency from 360 to 800 Hz. The unit is capable of operation on supply voltage consistent with aircraft electrical power systems normal operating tolerances without reduced performance. It is possible to use only one or two phases instead of three but it has to be ensured that the used power pin(s) will be the same on every seat box. The seat power supply unit is programmed so that a power factor of between 0.8 and 0.9 is maintained for each seat (applicable to the seat power supply unit) at full load.

The control unit can be a handheld LCD touch screen that displays a graphical user interface ("GUI") capable of controlling the functions of the seat 16 and other associated accoutrements. It commands the suite control module for seat, suite, lumbar, massage, lighting and privacy divider controls via a CANBUS. The seat control can be positioned in a cradle and with a retractable cord with its own CANBUS port independent from actuators.

The lumbar system includes a control box with bladders for various areas of the seat 16. The lumbar system is controlled by CANBUS protocol from the suite control module. The control unit provides commands to the suite control module which control the lumbar system. Individual bladders controlled through the suite control module via the control unit and are powered by 28VDC.

A digital passenger control panel ("DPCP") in the form of keypad containing discrete switches is mounted on the armrest and credenza. The digital passenger control panel system is powered by 12VDC from the suite control module for backlighting. The digital passenger control panel keypad has independent controls, such as buttons, for take-off and landing positions, dining, lounge and lie flat positions. The keypad can be backlit with LED's.

Actuators are provided that provide a motion speed of the seat 16 from TTOL to bed position (in unoccupied condition) in a maximum of 15 seconds. The motion speed in an occupied condition with a 90 kg passenger may be decreased by 10 percent compared to an unoccupied seat and decreased by 15% with a 130 kg passenger compared to unoccupied seat. The actuators include an override feature that allows the seat 16 to be returned to the TTOL position in the event of a power failure or system failure. The linear actuators are plug-and-play with no calibration required. The rotary actuators have the capability of being auto-calibrated without the plug and play feature.

All actuators situated in the primary load path, i.e., seat translation for fore and aft facing seats, and recline for aft facing seats only, have a positive locking mechanism such as a worm gear or crown tooth brake, and do not use friction brakes.

Electrical harnesses are provided to connect the electronics to the actuators, the seat control unit (SCU) and other LRUs. The harness sleeve is flexible enough to cover all wiring enclosed even when bent to its fullest bend radius, otherwise enough slack in the sleeve must exist to cover wiring at all times. The wiring also includes connections to the seat control unit, digital passenger control panel and all the suite lighting.

A shutdown switch allows the operator to shut down the suite control module. The switch is a Single Pole Single Throw ("SPST") switch capable of handling 10A continuous current. The switch is able to cut power to each individual suite's LRUs without interrupting power that continues to other suites.

The total power requirement for actuators, lights and lumbar is 250W. The electrical system controls up to four actuators and all lights at once for a period of at least 60 seconds. Lighting consumes no more than 90W. Embedded software onboard the suite control module monitors the seat control unit, digital passenger control panel and SIP and responds with the appropriate required function. The function is turned off if the electrical limit is reached and the passenger has not released the button. The software polls the SCU/DPCP every 40 milliseconds to verify command, controls the motor speed, ramp up, and ramp down slopes for each motion, and reads/writes from non-volatile memory where parameters are stored. The parameters are upload/downloadable from a PC by address.

The software monitors the temperature of the suite control module board to ensure safe thermal and overall performance and has a "smart" memory algorithm to allow memory movement to be continuous, with a minimum of motions. The software monitors the position of all motions during memory mode to avoid known obstacles and does not allow seat movement in the "exclusion zones" where permanent structures exist.

Windows based software is provided to allow configuration changes by all users from end user, to completion center, to seat technician, to full engineering access, and includes diagnostic routine to assist in troubleshooting. The PC Software has the ability to load and save information to the hard disk in a text format and is able to read all parameters in non-volatile memory and real-time data from the suite control module, for example, dynamic safety, electrical limits, sensors readings, current readings, etc. and the like. The PC software configures sequence, exclusion zone parameters, and other parameters.

The suite control unit controls seat, suite and light functions using a GUI that uses touch screen buttons. The seat control unit, when initially powered, displays a Menu Screen showing two menus from which to select—Seat Functions and Suite Functions—which have a predetermined GUI format.

Referring to FIG. 15, a seating system includes a plurality of seat actuator LRUs A(1), A(2) . . . A(n), a plurality of lighting LRUs L(1), L(2) . . . L(n), and a plurality of comfort/massage LRUs C(1), C(2) C(n) all connected in series via a network bus. In this system, actuator A(1) includes an electronic control unit (ECU) and functions as the suite control module (SCM) which responds to inputs from the seat control unit (SCU). In response to inputs from the SCU, the SCM sends control signals to the appropriate LRU to initiate the desired response by the LRU.

As further illustrated in FIG. 16, the seat control unit (SCU) includes an ECU and functions as the suite control module. Alternatively, one of the lighting LRUs L(1), L(2) . . . L(n) or one of the comfort/massage LRUs C(1), C(2) . . . C(n) can include an electronic control unit (ECU) and function as the suite control module ("SCM"; not shown).

In addition, as shown in FIG. 17, the seat control unit (SCU), a seat actuator LRU A(1), a lighting LRU L(1) and a comfort/massage LRU C(1) can each include an electronic control unit (ECU) and each function as the system's suite control module (SCM1, SCM2, SCM3, or SCM4) in the event that the original suite control module (SCM) fails. Alternatively, two or more seat actuator LRUs, two or more lighting LRUs, and/or two or more comfort/massage LRUs can each include an electronic control unit (ECU) and function as the system's suite control module as needed (not shown). As is shown in FIGS. 15, 16 and 17, a built-in test equipment ("BITE") module can detect any operational errors and store error codes in its memory that can be accessed when desired to test the system and correct logged errors.

An electromechanical actuation system for aircraft passenger suites and method is disclosed above. Various details of the electromechanical actuation system may be changed, altered, revised or rearranged without departing from the spirit and intended broad and general scope of the invention. Furthermore, the foregoing description of exemplary or preferred embodiments of the invention and the best mode for making, using and practising the invention are provided for the purpose of illustration only and not for the purpose of limitation. Instead, the scope of the invention is defined by the appended claims.

What is claimed is:

1. An electromechanical actuation system for an aircraft passenger suite for allowing passenger-initiated adjustment of a passenger seat and related passenger accoutrements, comprising:
   (a) a suite control unit configured to receive command signals from a user interface; and
   (b) a first line replacement unit comprising a first integral electronic control unit and a second line replacement unit coupled to the first line replacement;
   (c) wherein the first electronic control unit controls operation of the first line replacement unit and the second line replacement unit in response to command signals received from the suite control unit, wherein:
   the second line replacement unit includes a second integral electronic control unit, and the second electronic control unit controls operation of the second line replacement unit in response to user commands received from the suite control unit when the first electronic control unit becomes inoperative.

2. The electromechanical actuation system according to claim 1, wherein the first and second line control units are selected from the group consisting of electromechanical actuators, light assemblies, pumps and vibrators.

3. The electromechanical actuation system according to claim 1, further comprising a third line replacement unit, wherein the second electronic control unit controls operation of the second line replacement unit and the third line replacement unit in response to control signals received from the suite control unit when the first electronic control unit becomes inoperative.

4. The electromechanical actuation system according to claim 1, wherein the suite control unit, the first line replacement unit and the second line replacement unit are connected in series via a controller area network bus.

5. An electromechanical actuation system for a plurality of aircraft passenger suites for allowing passenger-initiated adjustment of a passenger seat and related passenger comfort accessories, comprising:
  (a) a passenger seat having seat back recline, legrest rotation, seat pan extension, seat forward/aft translation, armrest height travel, headrest height adjustment and lumbar inflation/deflation adjustment assemblies;
  (b) passenger-initiated actuators electromechanically connected to the adjustment assemblies for moving the adjustment assemblies, and adapted for preventing spacial interference between motions of two or more of the adjustment assemblies taking place during a time interval;
  (c) a plurality of seat control units for controlling the passenger-initiated actuators, wherein a selected seat control unit comprises an initial primary seat controller, the initial primary seat controller including a mechanical assembly, an electrical assembly and an electronic processor, electronic memory and a communication capability, and further wherein at least one of the other of the plurality of control units includes an integral electronic control unit and is adapted to assume the role of a substitute primary seat controller in the event of a malfunction in the initial primary seat controller, the initial primary seat controller and the other of the plurality of control units being arranged in series via a network bus; and
  (d) a passenger control panel for permitting a passenger seated in one of the seats to control the passenger seat adjustment assemblies.

6. The electromechanical actuation system according to claim 5, further comprising a vertically adjustable privacy divider positioned between first and second laterally-adjacent seat suites, wherein the primary seat controller includes passenger priority sequencing that allows a first passenger seated in the first seat to control the position of the privacy divider to the exclusion of a second passenger seated in the second seat while activating a privacy divider control, and that allows the second passenger seated in the second seat to control the position of the privacy divider while activating a privacy divider control to the exclusion of the first passenger seated in the first seat.

7. The electromechanical actuation system according to claim 5, further including an obstacle sensor that functions, when an obstacle is encountered during movement of a seat adjustment assembly, to command the passenger-initiated actuator to stop moving, move the seat a predetermined distance in an opposite direction, and stop.

8. An electromechanical actuation system for an aircraft passenger suite for allowing passenger-initiated adjustment of a passenger seat and related passenger accoutrements, comprising:
  (a) a suite control unit configured to receive command signals from a user interface; and
  (b) a first line replacement unit comprising a first integral electronic control unit and a second line replacement unit coupled to the first line replacement;
  (c) wherein the first electronic control unit controls operation of the first line replacement unit and the second line replacement unit in response to command signals received from the suite control unit,
  (d) wherein the electromechanical actuation system further comprises a third line replacement unit,
  (e) wherein the second electronic control unit controls operation of the second line replacement unit and the third line replacement unit in response to control signals received from the suite control unit when the first electronic control unit becomes inoperative.

* * * * *